Patented Dec. 21, 1943

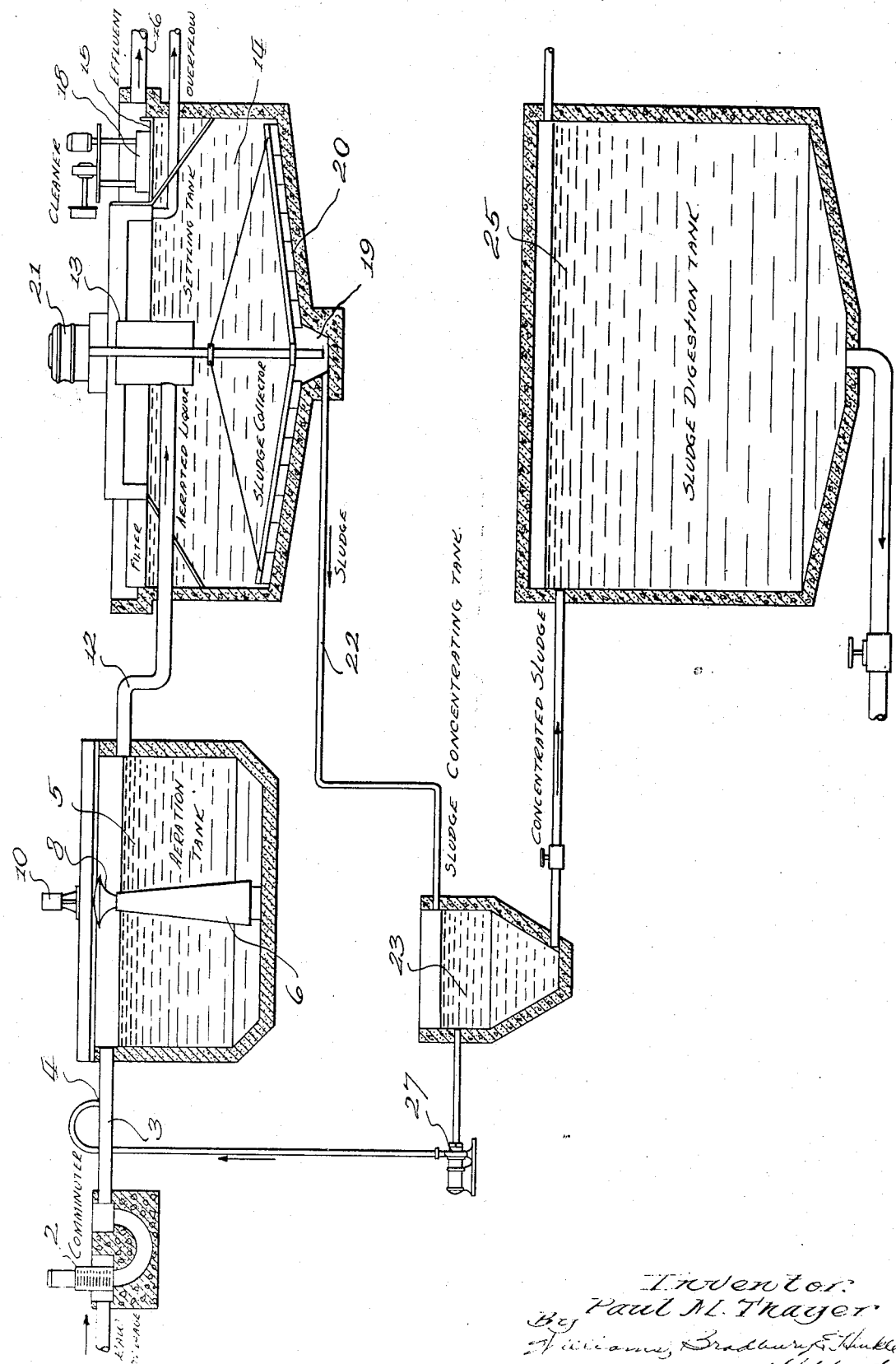

2,337,507

UNITED STATES PATENT OFFICE 2,337,507

SEWAGE TREATMENT METHOD AND APPARATUS

Paul M. Thayer, Milwaukee, Wis.

Application August 3, 1940, Serial No. 350,966

8 Claims. (Cl. 210—8)

This invention relates to sewage treatment method and apparatus in which sludge removed from the sewage in a settlement tank is classified in a separate chamber from that in which it is originally settled, the heavy part of the sludge being conducted to a sludge digestion chamber and the lighter part being returned to and mixed with the incoming sewage.

In accordance with my invention, the type of sewage sludge which passes to the digestion tank and that which returns to the aeration tank, are separated in accordance with their virility. The most active sludge and that which is capable of retaining its activity under adverse conditions remains relatively light even after standing for a considerable time in contact with less virile sludge, and, therefore, by a second settling operation, is removable from the upper part of a second settlement tank while the thickened sludge, more suitable for digestion, is removable from the bottom of such tank.

My invention is illustrated diagrammatically in the accompanying drawing, which represents a sewage treatment and sludge digesting plant in its essentials.

In the illustrated embodiment of my invention, raw sewage is delivered to a comminutor 2 which reduces all of the sewage solids to a size that they will readily circulate with the liquid and become converted either into digestible solids or useful activated sludge.

From the comminutor 2, the liquid and solids flow together through a conduit 3 to an aeration tank 5, previously activated classified sludge being admitted to the conduit 3 at the junction 4 and flowing with the raw sewage into the aeration tank 5.

The aeration tank 5 may be of any type suitable for the activated sludge process. As here shown, it comprises a vertical centrally located tubular member 6 open at the bottom to take in liquid and sludge and provided with a deflector 9 at the top which spreads the sewage and sludge in a mushroom shaped violent rain over the entire surface of the liquid in the tank 5. The flow of the material in the tubular member 6 is caused by a screw propeller, not shown, driven by a motor 10 axially mounted above the tubular member 6. The flow of sewage and sludge is sufficiently rapid that even the heavy sludge is kept in circulation with the liquid up the tube 6, down the entire area of the tank, and across the floor to the entrance of the tube 6. The tank 5 is made of such size that the average retention period for the sewage is from two to six hours, this being a sufficient time with the character of sludge provided by my improved method and apparatus thoroughly to oxidize the sewage and flocculate the sludge.

A conduit 12 leads from the level of the liquid surface in the tank 5 to an inlet ring 13 centrally located in a settling tank 14. The ring 13 prevents the inflowing sewage and sludge from creating an agitation of the liquid and sludge in the settling tank, and permits the mixed material to flow gently out of the bottom of the ring, from which it spreads somewhat evenly over the area of the tank. The sludge, both heavy and light, eventually settles to the bottom of the tank, and the clear liquid flows upwardly through the screen 15 and to the outfall through overflow pipe 16. The screen 15 is kept free of clogging particles by the periodic backflow of clear liquid forced downwardly through the screen by the traveling nozzle device 18. It will be understood that the sewage and sludge flowing to the settling tank from the aeration tank is a mixture of sludges, some of which have been treated only a very short time in the aeration tank, and some of which have remained in the tank for a period much longer than the average, and of all intermediately treated sludges, and in addition, of sludge which has passed through the aeration tank not only once, but many times before.

All of these various kinds of sludges are either immediately or later of sufficient gravity to settle to the bottom of the settling tank. Such sludges as are at first light enough to float are prevented from passing out with the effluent by the screen 15, and eventually give off their gases and settle to the bottom of the settling tank.

All of the mixture of sludges which settles upon the bottom of the settling tank 14 is gradually scraped to the middle of the tank and into the sump 19 by the traveling scraping blades 20, which are slowly moved around the tank by power means 21.

All of the material, which includes both sewage solids and several kinds of sewage sludges, flows together through the conduit 22 into the classification tank 23, which must be of such a size that the incoming sludge maintains a slight degree of agitation within the tank. Here the really heavy sludges sink immediately to the bottom and pass at a regulated rate to the digestion tank 25, where digestion takes place in the usual manner but without interference from the very active aerobic bacterial matter which, by my invention, is largely separated from the more readily digestible sludge in the classifier 23.

The highly aerobic bacterial sludges forming a part of the mixture of sludges in the classifier 23 are lighter than the other sludges, and therefore become stratified in the upper portion of the classification tank 23, and pumped by means of the pump 27 back into the junction 4 with the conduit 3.

By the use of my method and apparatus, sewage treatment plants may be operated more economically than if the sludge returned to the aeration tank from the settling tank is made up of either a conglomerate of the sludges settled in the aeration tank or of classified sludge made immediately after the material has arrived in the main settling tank and before some of the absorbed or attached gases have been discharged from the sludge.

It is to be understood that the apparatus of this disclosure may be varied without departing from the scope of my invention and that the method may be carried out with a large variety of known devices.

I claim:

1. That method of sewage treatment by the activated sludge process which comprises settling all of the sludge from the aeration tank in a settling tank and thereafter classifying by gravity the sludge from the settling tank, returning the lighter part of the sludge to the aeration tank and disposing of the heavier part of the sludge.

2. That method of sewage treatment and sludge disposal which comprises continuously aerating the incoming sewage at one location in the presence of its own and previously prepared sludge, continuously settling the sludge from the liquid at a second location, continuously discharging separated clarified liquid and sludge from said second location, continuously gently agitating the sludge at a third location, continuously separating the heavy from the light sludge at said third location, and continuously returning the light sludge to the aeration location and disposing of the heavy sludge.

3. The method of sludge disposal which comprises removing a mixture of all kinds of sewage sludge settling to the bottom of an activated sludge settling tank from the tank, classifying by gravity the sludge thus removed, passing the heavy sludge to a digestion tank, and passing the light sludge to an aeration tank for use in treating raw sewage.

4. The method of sewage treatment and sludge disposal which comprises permitting aerobic bacterial activated sludge to become partially anaerobic by standing in the bottom of a settling tank in contact with other anaerobic bacterial sludge, removing the mixture of such sludges and subjecting them to gravity classification, transferring the heavier anaerobic bacterial sludge to a digester, and transferring the lighter aerobic bacterial sludge to an aeration tank for use in treating raw sewage.

5. In a sewage treatment system in combination, an aeration tank, a settling tank connected therewith to receive all of the liquid and sludge from the aeration tank, a classification tank connected to the bottom of the settling tank to receive all of the sludge from the settling tank, a digester tank connected to the bottom of the classification tank to receive the heavy sludge from the bottom of the classification tank, and a connection between the upper part of the classification tank to conduct the light sludge to the aeration tank.

6. In a sludge disposal system, a sludge settling tank, a sludge classifying tank, a conduit extending from the bottom of the sludge settling tank to the sludge classifying tank, a sludge digesting tank, a conduit extending from the bottom of said classifying tank to said digesting tank, an aerating tank, a conduit extending from a high level in said classifying tank to said aerating tank, a conduit extending from said aerating tank to said settling tank, and means to maintatin the flow of sludge through all of said conduits.

7. In a sludge disposal system, an aerating tank, a sludge settling tank connected to said aerating tank to receive all the sludge and liquid therefrom, a sludge classifying tank connected to said settling tank to receive all the settled sludge from the latter, a connection from the upper part of said classifying tank to said aerating tank to conduct light sludge to the latter, and an outlet at the bottom of said classifying tank for disposing of heavy sludge therefrom.

8. In an activated sludge disposal system of the type comprising an aeration tank, the combination including, a settling tank supplied with the sludge and liquid from the aeration tank, a sludge classifying tank connected to the settling tank and receiving all the settled sludge from the settling tank, means for returning to the aeration tank light sludge from the upper part of the classifying tank, and means for withdrawing and disposing of the heavy sludge collecting at the bottom of the classifying tank.

PAUL M. THAYER.